(12) United States Patent
Ning et al.

(10) Patent No.: US 8,439,626 B2
(45) Date of Patent: *May 14, 2013

(54) TURBINE AIRFOIL CLOCKING

(75) Inventors: Wei Ning, Greenville, SC (US); Michael E. Friedman, Simpsonville, SC (US); John F. Ryman, Greer, SC (US)

(73) Assignee: General Electric Company, Schenectady, NY (US)

( * ) Notice: Subject to any disclaimer, the term of this patent is extended or adjusted under 35 U.S.C. 154(b) by 1138 days.

This patent is subject to a terminal disclaimer.

(21) Appl. No.: 12/344,826

(22) Filed: Dec. 29, 2008

(65) Prior Publication Data

US 2010/0166538 A1  Jul. 1, 2010

(51) Int. Cl.
 *F01D 5/28* (2006.01)
(52) U.S. Cl.
 USPC .............................................. 415/1; 415/130
(58) Field of Classification Search ............... 415/1, 130
 See application file for complete search history.

(56) References Cited

U.S. PATENT DOCUMENTS

| | | | |
|---|---|---|---|
| 5,486,091 A | 1/1996 | Sharma | |
| 5,681,142 A | 10/1997 | Lewis | |
| 6,174,129 B1 * | 1/2001 | Mazzola et al. | 415/127 |
| 6,402,458 B1 * | 6/2002 | Turner | 415/1 |
| 6,554,562 B2 * | 4/2003 | Dudebout et al. | 415/1 |
| 6,913,441 B2 * | 7/2005 | Fadok | 415/189 |
| 2002/0057966 A1 | 5/2002 | Fiala et al. | |
| 2006/0257238 A1 | 11/2006 | Fiala | |

FOREIGN PATENT DOCUMENTS

| | | |
|---|---|---|
| EP | 1182339 A2 | 2/2002 |
| WO | 9529331 A2 | 11/1995 |

OTHER PUBLICATIONS

European Patent Office Search Report.

* cited by examiner

*Primary Examiner* — George Fourson, III
(74) *Attorney, Agent, or Firm* — Mark E. Henderson; Ernest G. Cusick; Frank A. Landgraff

(57) ABSTRACT

A method of decreasing the operational stresses acting on a target airfoil row in a turbine engine; wherein the target airfoil row is bordered on each side by a first upstream airfoil row and a first downstream airfoil row; the first upstream airfoil row and the first downstream airfoil row having substantially the same number of similar airfoils and both comprising one of a row of rotor blades and a row of stator blades, and the target airfoil row comprising the other; the method comprising the step of: configuring the circumferential position of the airfoils of the first upstream airfoil row and the airfoils of first downstream airfoil row such that at least a portion of the airfoils of the first upstream airfoil row and at least a portion of the airfoils of the first downstream airfoil row comprise a clocking relationship of between 25% and 75% pitch.

37 Claims, 8 Drawing Sheets

TURBINE AIRFOIL CLOCKING

BACKGROUND OF THE INVENTION

This present application relates to methods for designing, assembling and operation turbine engines. More specifically, but not by way of limitation, the present application relates to methods for positioning airfoils in one row with respect to the positioning of airfoils in neighboring or nearby rows such that certain operational benefits are achieved.

A gas turbine engine typically includes a compressor, a combustor, and a turbine. The compressor and turbine generally include rows of airfoils or blades that are axially stacked in stages. Each stage generally includes a row of circumferentially spaced stator blades, which are fixed, and a set of circumferentially spaced rotor blades, that rotate about a central axis or shaft. Generally, in operation, the rotor blades in the compressor rotor rotate about the shaft to compress a flow of air. The supply of compressed air is used in the combustor to combust a supply of fuel. The resulting flow of hot gases from the combustion is expanded through the turbine, which causes the turbine rotor blades to rotate about the shaft. In this manner, the energy contained in the fuel is converted into the mechanical energy of the rotating blades, which may be used to rotate the rotor blades of the compressor and the coils of a generator to generate electricity. During operation, because of the extreme temperatures, the velocity of the working fluid, and the rotational velocity of the rotor blades, the stator blades and the rotor blades, through both the compressor and the turbine, are highly stressed parts.

Often, in both the compressor and the turbine sections of the turbine engine, rows of stator or rotor blades of nearby or neighboring stages are configured with substantially the same number of circumferentially spaced blades. In an effort to improve the aero-efficiency of turbine engines, efforts have been made to index or "clock" the relative circumferential positions of the blades in one row to the circumferential position of the blades in nearby or neighboring rows. However, while only minimally or negligibly improving engine aero-efficiency, it has been discovered that such conventional clocking methods generally function to increase the mechanical stresses acting on airfoils during operation. Of course, increased operational stresses can cause blade failures, which may result in extensive damage to the gas turbine engine. At the very least, increased operational stresses shorten the part life of the airfoils, which increases to the cost of operating the engine.

The ever-increasing demand for energy makes the objective of engineering more efficient turbine engines an ongoing and significant one. However, many of the ways in which turbine engines are made more efficient place additional stress on the airfoils of the compressor and turbine sections of the engine. That is, turbine efficiency generally may be increased through several means, including greater size, firing temperatures, and/or rotational velocities, all of which place greater strain on the airfoils during operation. As a result, new methods and systems that reduce the stresses on turbine airfoils are needed. A new method or system for clocking turbine airfoils that reduces the operational stresses acting on airfoils would be an important step toward engineering more efficient turbine engines.

BRIEF DESCRIPTION OF THE INVENTION

The present application thus describes a method of decreasing the operational stresses acting on a target airfoil row in a turbine engine; wherein the target airfoil row is bordered on each side by a first upstream airfoil row, which comprises the first row of airfoils in the upstream direction from the target airfoil row, and a first downstream airfoil row, which comprises the first row of airfoils in the downstream direction from the target airfoil row; the first upstream airfoil row and the first downstream airfoil row having substantially the same number of similar airfoils and both comprising one of a row of rotor blades and a row of stator blades, and the target airfoil row comprising the other; the method comprising the step of: configuring the circumferential position of the airfoils of the first upstream airfoil row and the airfoils of first downstream airfoil row such that at least a portion of the airfoils of the first upstream airfoil row and at least a portion of the airfoils of the first downstream airfoil row comprise a clocking relationship of between 25% and 75% pitch.

The present application further describes (in a turbine engine that has been in use for at least 3 months and includes at least three successive axially stacked rows of airfoils) a method of modifying the operation of the turbine engine so to decrease the operational stresses acting on one or more of the airfoil rows, the method including the steps of: (a) identifying whether the turbine engine has a pair of airfoil rows, a first airfoil row and a second airfoil row, that reside in close proximity to each other in one of a compressor or a turbine of the turbine engine; have substantially no relative motion between them during operation; have substantially the same relative motion in respect to a third airfoil row that is positioned between the first airfoil row and the second airfoil row; and have substantially the same number of similarly shaped airfoils; and (b) configuring the circumferential position of the airfoils of the first airfoil row and the airfoils of the second airfoil row such that at least a portion of the airfoils of the first airfoil row and at least a portion of the airfoils of the second airfoil row comprise a clocking relationship of between 25% and 75% pitch.

The present application further describes (in manufacturing operation that includes assembling gas turbine engines that include at least three successive axially stacked rows of airfoils) a method of assembling the airfoil rows of the gas turbine engines so to decrease the operational stresses acting on one or more of the airfoil rows, the method including the steps of: (a) identifying the gas turbines engine designs that have a pair of airfoil rows, a first airfoil row and a second airfoil row, that: reside in close proximity to each other in one of a compressor or a turbine of the turbine engine; have substantially no relative motion between them during operation; have substantially the same relative motion in respect to a third airfoil row that is positioned between the first airfoil row and the second airfoil row; and have substantially the same number of similarly shaped airfoils; and b) for at least a majority of the gas turbine engines that are assembled that are of the gas turbine engine design identified in step (a), configuring the circumferential position of the airfoils of the first airfoil row and the airfoils of the second airfoil row such that at least a portion of the airfoils of a first airfoil row and at least a portion of the airfoils of the second airfoil row comprise a clocking relationship of between 25% and 75% pitch.

These and other features of the present application will become apparent upon review of the following detailed description of the preferred embodiments when taken in conjunction with the drawings and the appended claims.

BRIEF DESCRIPTION OF THE DRAWINGS

These and other objects and advantages of this invention will be more completely understood and appreciated by careful study of the following more detailed description of exemplary embodiments of the invention taken in conjunction with the accompanying drawings, in which.

DETAILED DESCRIPTION OF THE INVENTION

Figure 1:
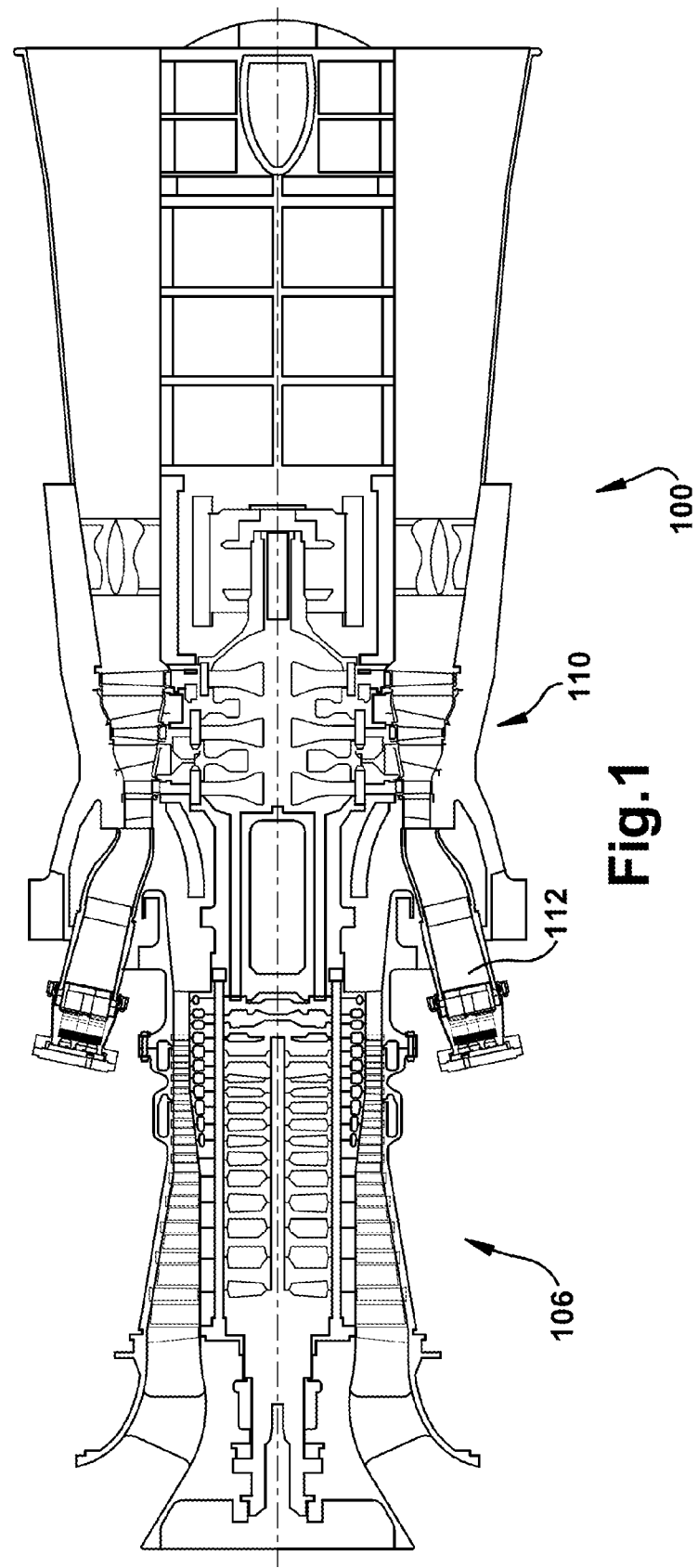
FIG. 1 is a schematic representation of an exemplary turbine engine in which embodiments of the present application may be used.

Referring now to the figures, FIG. 1 illustrates a schematic representation of a gas turbine engine 100. In general, gas turbine engines operate by extracting energy from a pressurized flow of hot gas that is produced by the combustion of a fuel in a stream of compressed air. As illustrated in FIG. 1, gas turbine engine 100 may be configured with an axial compressor 106 that is mechanically coupled by a common shaft or rotor to a downstream turbine section or turbine 110, and a combustor 112 positioned between the compressor 106 and the turbine 110. Note that the following invention may be used in all types of turbine engines, including gas turbine engines, steam turbine engines, aircraft engines, and others. Further, the invention described herein may be used in turbine engines with multiple shaft and reheat configurations, as well as, in the case of gas turbine engines, with combustors of varying architecture, for example, annular or can combustor configurations. Hereinafter, the invention will be described in relation to an exemplary gas turbine engine, as depicted in FIG. 1. As one of ordinary skill in the art will appreciate, this description is exemplary only and not limiting in any way.

Figure 2:
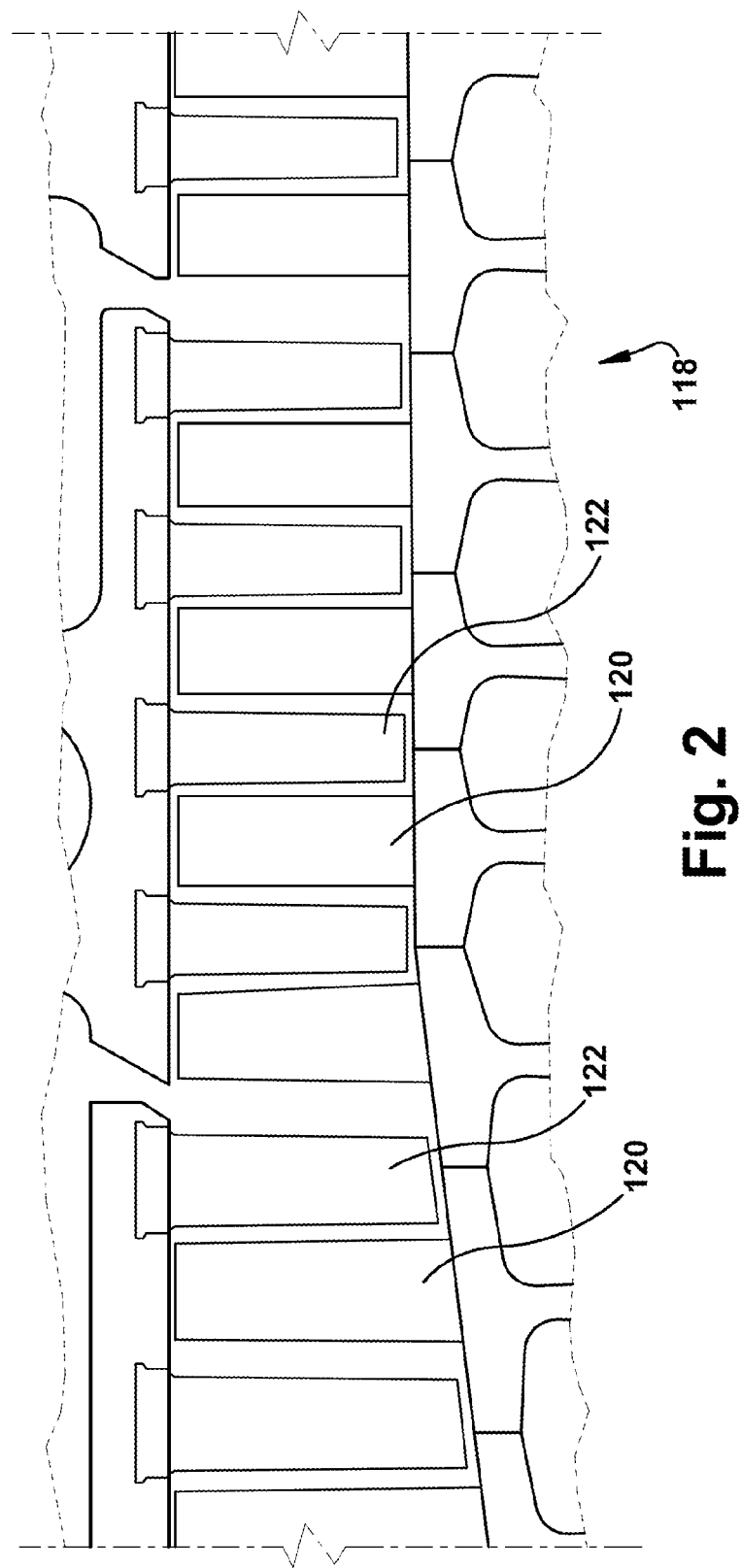
FIG. 2 is a sectional view of a compressor in a gas turbine engine in which embodiments of the present application may be used.

FIG. 2 illustrates a view of an exemplary multi-staged axial compressor 118 that may be used in gas turbine engine. As shown, the compressor 118 may include a plurality of stages. Each stage may include a row of compressor rotor blades 120 followed by a row of compressor stator blades 122. Thus, a first stage may include a row of compressor rotor blades 120, which rotate about a central shaft, followed by a row of compressor stator blades 122, which remain stationary during operation. The compressor stator blades 122 generally are circumferentially spaced one from the other and fixed about the axis of rotation. The compressor rotor blades 120 are circumferentially spaced about the axis of the rotor and rotate about the shaft during operation. As one of ordinary skill in the art will appreciate, the compressor rotor blades 120 are configured such that, when spun about the shaft, they impart kinetic energy to the air or working fluid flowing through the compressor 118. As one of ordinary skill in the art will appreciate, the compressor 118 may have many other stages beyond the stages that are illustrated in FIG. 2. Each additional stage may include a plurality of circumferential spaced compressor rotor blades 120 followed by a plurality of circumferentially spaced compressor stator blades 122.

Figure 3:
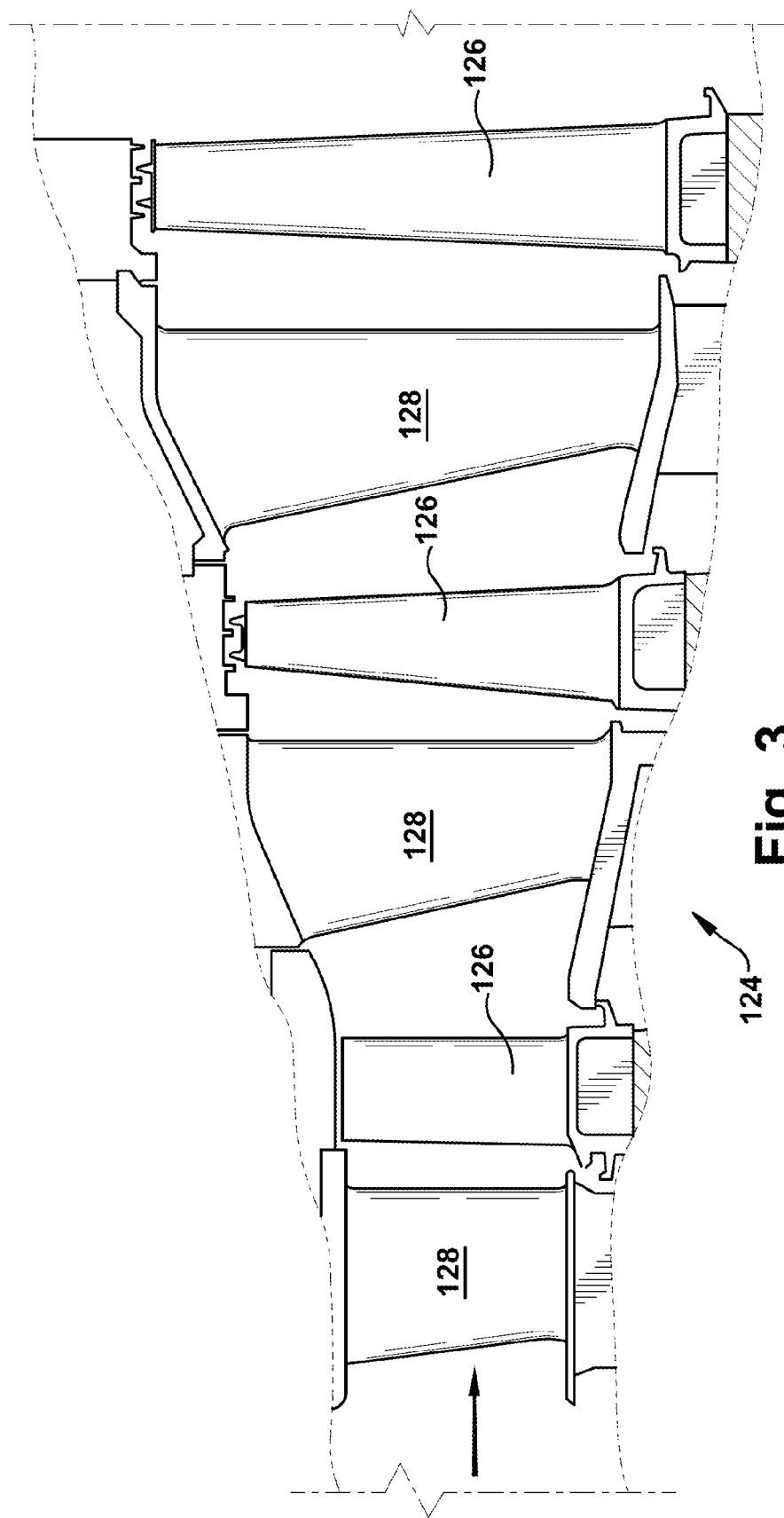
FIG. 3 is a sectional view of a turbine in a gas turbine engine in which embodiments of the present application may be used.

FIG. 3 illustrates a partial view of an exemplary turbine 124 that may be used in the gas turbine engine. Turbine 124 may include a plurality of stages. Three exemplary stages are illustrated, but more or less stages may present in the turbine 124. A first stage includes a plurality of turbine buckets or turbine rotor blades 126, which rotate about the shaft during operation, and a plurality of nozzles or turbine stator blades 128, which remain stationary during operation. The turbine stator blades 128 generally are circumferentially spaced one from the other and fixed about the axis of rotation. The turbine rotor blades 126 may be mounted on a turbine wheel (not shown) for rotation about the shaft (not shown). A second stage of the turbine 124 is also illustrated. The second stage similarly includes a plurality of circumferentially spaced turbine stator blades 128 followed by a plurality of circumferentially spaced turbine rotor blades 126, which are also mounted on a turbine wheel for rotation. A third stage also is illustrated, and similarly includes a plurality of circumferentially spaced turbine stator blades 128 and turbine rotor blades 126. It will be appreciated that the turbine stator blades 128 and turbine rotor blades 126 lie in the hot gas path of the turbine 124. The direction of flow of the hot gases through the hot gas path is indicated by the arrow. As one of ordinary skill in the art will appreciate, the turbine 124 may have many other stages beyond the stages that are illustrated in FIG. 3. Each additional stage may include a plurality of circumferential spaced turbine stator blades 128 followed by a plurality of circumferentially spaced turbine rotor blades 126.

Note that as used herein, reference, without further specificity, to "rotor blades" is a reference to the rotating blades of either the compressor 118 or the turbine 124, which include both compressor rotor blades 120 and turbine rotor blades 126. Reference, without further specificity, to "stator blades" is a reference to the stationary blades of either the compressor 118 or the turbine 124, which include both compressor stator blades 122 and turbine stator blades 128. The term "airfoil" will be used herein to refer to either type of blade. Thus, without further specificity, the term "airfoil" is inclusive to all type of turbine engine blades, including compressor rotor blades 120, compressor stator blades 122, turbine rotor blades 126, and turbine stator blades 128.

In use, the rotation of compressor rotor blades 120 within the axial compressor 118 may compress a flow of air. In the combustor 112, energy may be released when the compressed air is mixed with a fuel and ignited. The resulting flow of hot gases from the combustor 112 then may be directed over the turbine rotor blades 126, which may induce the rotation of the turbine rotor blades 126 about the shaft, thus transforming the energy of the hot flow of gases into the mechanical energy of the rotating shaft. The mechanical energy of the shaft may then be used to drive the rotation of the compressor rotor blades 120, such that the necessary supply of compressed air is produced, and also, for example, a generator to produce electricity.

Often, in both gas turbine compressors 106 and turbines 110, nearby or neighboring rows of airfoils 130 may have substantially the same configuration, i.e., have the same number of similarly sized airfoils that are spaced similarly around the circumference of the row. When this is the case and, in addition, when two or more rows operate such that there is no relative motion between each (as would be the case, for example, between two or more rows of rotor blades or two or more rows of stator blades), the airfoils in these rows may be "clocked." As used herein, the term "clocked" or "clocking" refers to the fixed circumferential positioning of airfoils in one row in relation to the circumferential positioning of airfoils in nearby rows.

FIGS. 4 through 7 illustrate simplified schematic representations of examples of how rows of airfoils 130 may be clocked. These figures include three rows of airfoils 130 shown side-by-side. The two outer rows of airfoils 130 in FIGS. 4 through 7 may each represent a row of rotor blades and the row in the middle may represent a row of stator blades, or, as one of ordinary skill in the art will appreciate, the two outer rows may represent a row of stator blades and the row in the middle may represent a row of rotor blades. As one of ordinary skill in the art will appreciate, the two outer rows, whether they are stator blades or rotor blades, have substantially no relative motion between them (i.e., both remain stationary or both rotate at the same velocity during operation), whereas both of the outer rows have substantially the same relative motion in relation to the middle row (i.e., both of the outer rows rotate while the middle row remains stationary or both of the outer rows remain stationary while the middle row rotates). Further, as already described, for clocking to be most effective between the two outer rows, they each must be configured similarly. As such, the two outer rows of FIGS. 4 through 7 can be assumed to have substantially the same number of airfoils, and the airfoils on each row can be assumed to be similarly sized and spaced around the circumference of each row.

For the sake of the examples in FIGS. 4 through 7, the first outer row of airfoils will be referred to as a first airfoil row 134, the middle row of airfoils will be referred to as a second airfoil row 136, and the other outer row of airfoils will be referred to as a third airfoil row 138. The relative motion of the first airfoil row 134 and the third airfoil row 138 is indicated by arrows 140. The flow direction, which may represent the direction of flow through either the compressor 118 or the turbine 124, whatever the case may be, is indicated by arrows 142. Note that the exemplary rows of airfoils used in FIGS. 4 through 7 have been described with the terms "first", "second," and "third". This description is applicable only to the relative positioning of the illustrated rows in regard to the other rows in each of the figures, and is not indicative of overall positioning with respect to other rows of airfoils in the turbine engine. For example, other rows of airfoils may be positioned upstream of "first airfoil row 136" (i.e., the first airfoil row 136 is not necessarily the first row of airfoils in the turbine engine).

The "pitch" of a row of airfoils is used herein to refer to the measurement of the repeating pattern around the circumference of a particular row. Thus, the pitch may be described as the circumferential distance between, for example, the leading edge of an airfoil in a particular row and the leading edge of either of the neighboring airfoils in the same row. The pitch also, for example, may describe the circumferential distance between the trailing edge of an airfoil in a particular row and the trailing edge of either of the neighboring airfoils in the same row. It will be appreciated that in order for clocking to be more effective, the two rows generally will have similar pitch measurements. The first airfoil row 134 and the third airfoil row 138, as illustrated, have substantially the same pitch, which has been indicated in the third airfoil row 138 on FIG. 4 as distance 144. Note also that the clocking examples of FIGS. 4 through 7 are provided so that a consistent method of describing various clocking relationships between nearby or neighboring airfoil rows may be delineated and understood. In general, as described more fully below, the clocking relationship between two rows will be given as the percentage of the pitch measurement. That is, it is the percentage of the pitch measurement that indicates the distance by which the airfoils on the two rows are clocked or offset. Thus, the percentage of the pitch measurement may describe the circumferential distance by which, for example, the leading edge of an airfoil on a particular row and the leading edge of a corresponding airfoil on a second row are offset from each other.

Figure 4:
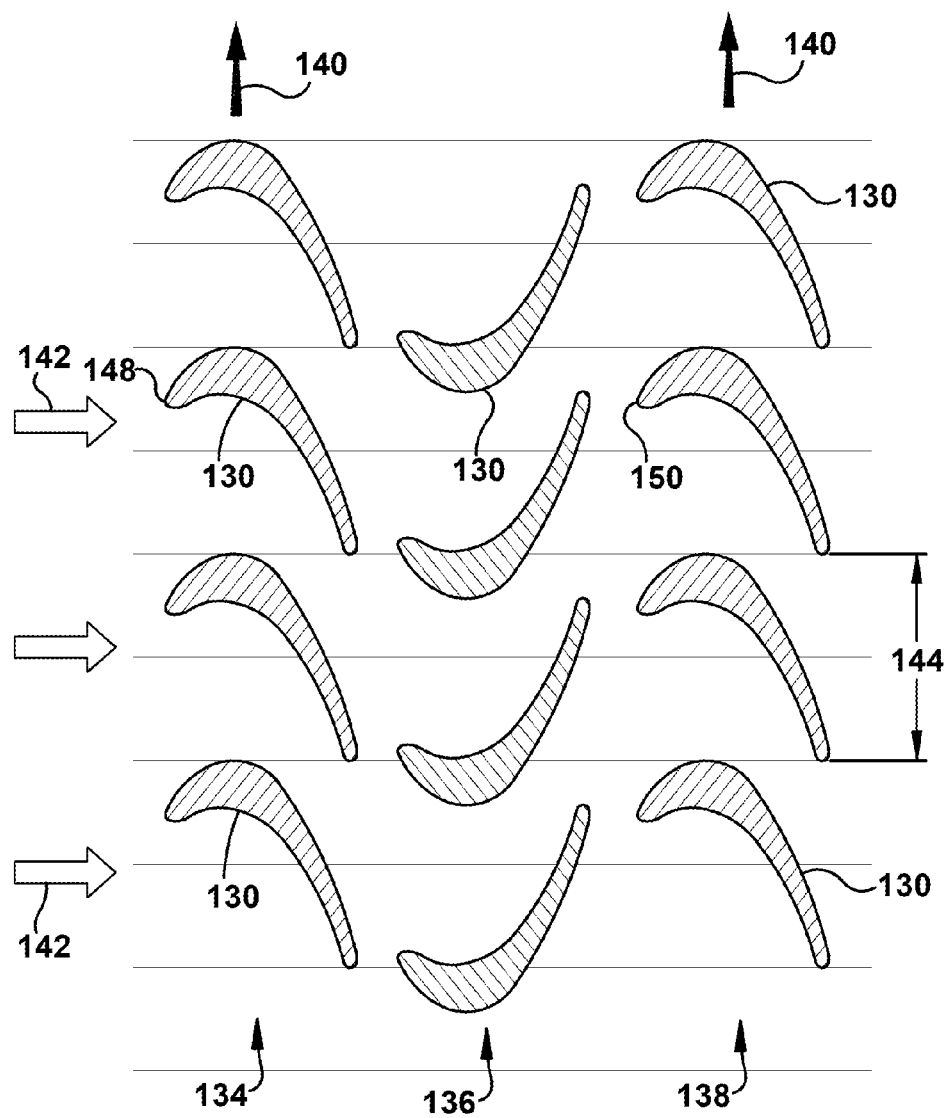
FIG. 4 is a schematic representation of neighboring rows of airfoils illustrating an exemplary clocking relationship.

FIGS. 4 through 7 provide several examples of different clocking relationships between the two outer rows, i.e., the first airfoil row 134 and the third airfoil row 138. In FIG. 4, as will be appreciated, the third airfoil row 138 is offset by approximately 0% pitch in relation to the first airfoil row 134. Thus, as illustrated, the circumferential position of an airfoil 130 in the third airfoil row 138 lags the corresponding airfoil 130 in the first airfoil row 134 by an offset of approximately 0% of the pitch measurement, which, of course, means the airfoil 130 in the third airfoil row 138 maintains substantially the same circumferential position as the corresponding airfoil 130 in the first airfoil row 134. As such, a leading edge of an airfoil 130 in the first airfoil row 134 (one of which is identified with reference number 148) leads the leading edge of the corresponding airfoil 130 in the third airfoil row 138 (which is identified with reference number 150) by a circumferential distance of approximately 0% of the pitch measurement, which means that the leading edges of the corresponding airfoils occupy substantially the same circumferential position.

Figure 5:
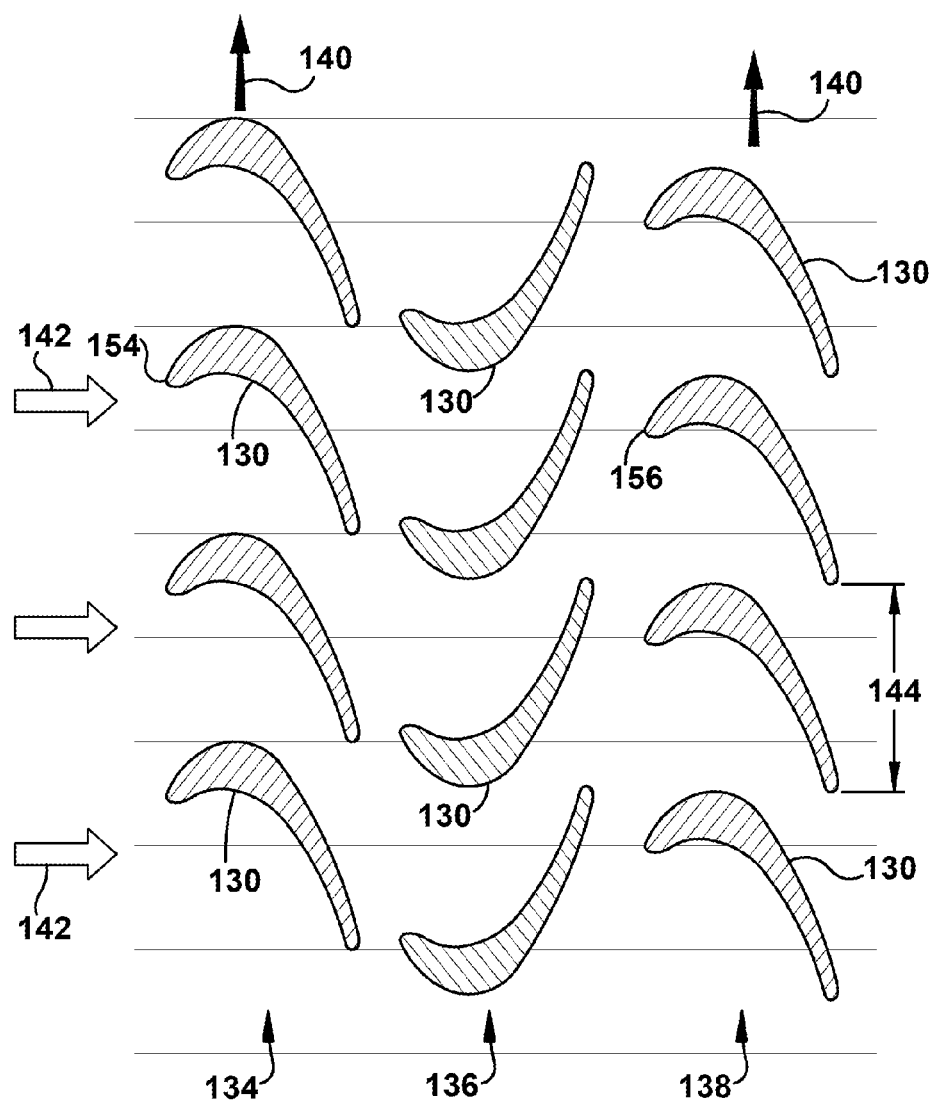
FIG. 5 is a schematic representation of neighboring rows of airfoils illustrating an exemplary clocking relationship.

In FIG. 5, as will be appreciated, the third airfoil row 138 is offset by approximately 25% pitch in relation to the first airfoil row 134. Thus, as illustrated, the circumferential position of an airfoil 130 in the third airfoil row 138 lags (given the direction of relative motion of the outer rows) the corresponding airfoil 130 in the first airfoil row 134 by an offset of approximately 25% of the pitch measurement. As such, a leading edge of an airfoil 130 in the first airfoil row 134 (one of which is identified with reference number 154) leads the leading edge of the corresponding airfoil 130 in the third airfoil row 138 (which is identified with reference number 156) by a circumferential distance of approximately 25% of the pitch measurement.

Figure 6:
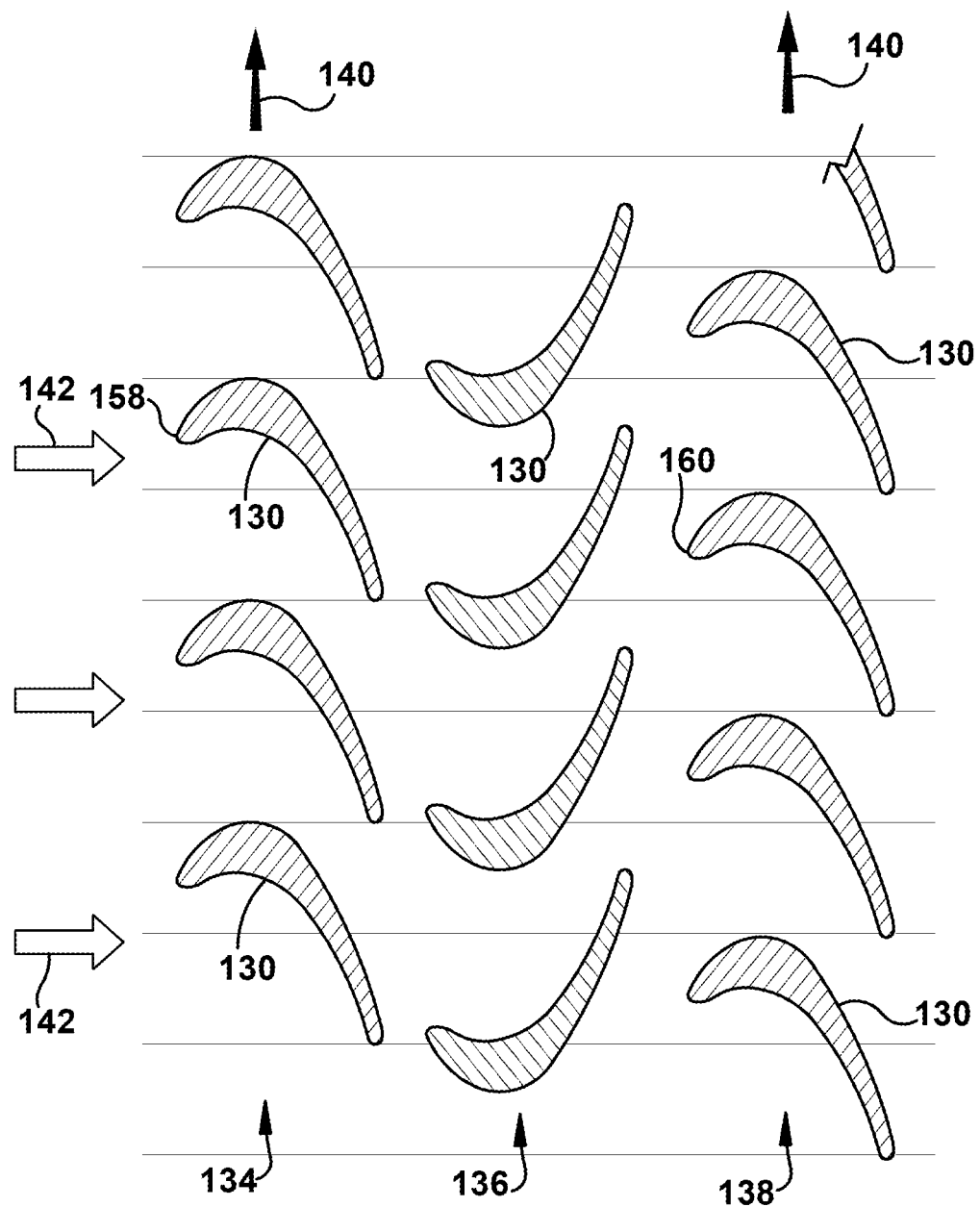
FIG. 6 is a schematic representation of neighboring rows of airfoils illustrating an exemplary clocking relationship.

In FIG. 6, as will be appreciated, the third airfoil row 138 is offset by approximately 50% pitch in relation to the first airfoil row 134. Thus, as illustrated, the circumferential position of an airfoil 130 in the third airfoil row 138 lags (given the direction of relative motion of the outer rows) the corresponding airfoil 130 in the first airfoil row 134 by an offset of approximately 50% of the pitch measurement. As such, a leading edge of an airfoil 130 in the first airfoil row 134 (one of which is identified with reference number 158) leads the leading edge of the corresponding airfoil 130 in the third airfoil row 138 (which is identified with reference number 160) by a circumferential distance of approximately 50% of the pitch measurement.

Figure 7:
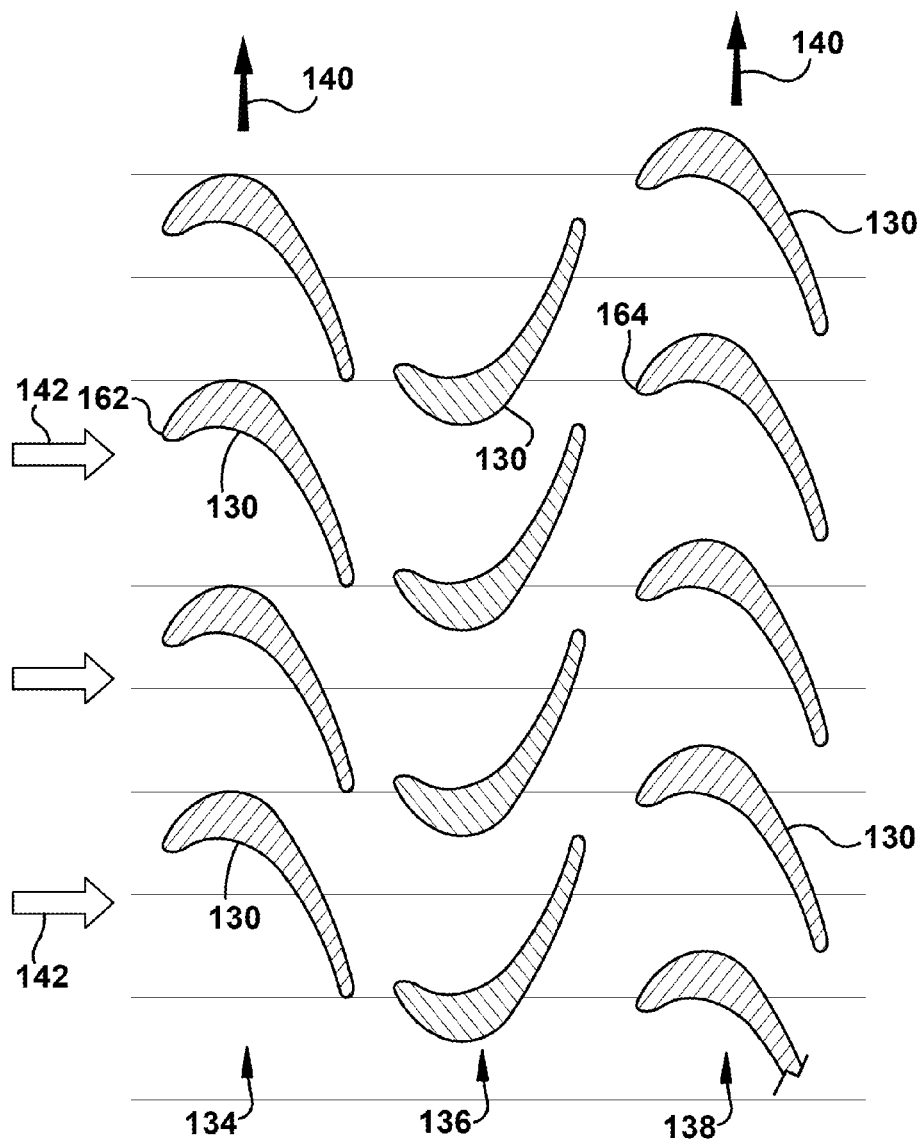
FIG. 7 is a schematic representation of neighboring rows of airfoils illustrating an exemplary clocking relationship.

In FIG. 7, as will be appreciated, the third airfoil row 138 is offset by approximately 75% pitch in relation to the first airfoil row 134. Thus, as illustrated, the circumferential position of an airfoil 130 in the third airfoil row 138 lags (given the direction of relative motion of the outer rows) the corresponding airfoil 130 in the first airfoil row 134 by an offset of approximately 75% of the pitch measurement. As such, a leading edge of an airfoil 130 in the first airfoil row 134 (one of which is identified with reference number 162) leads the leading edge of the corresponding airfoil 130 in the third airfoil row 138 (which is identified with reference number 164) by a circumferential distance of approximately 75% of the pitch measurement.

Of course, the airfoils 130 may be clocked differently (i.e., maintain different offsets between the first and third airfoil row) that the relationships described above (i.e., 0%, 25%, 50%, 75% pitch). While some of the clocking relationships described above are within certain embodiments of the current invention (as described in more detail below), they are also exemplary and intended to make clear a method for describing clocking relationships between several nearby or neighboring rows of airfoils. Those of ordinary skill in the art will appreciate that other methods may be used to describe clocking relationships. The exemplary method used herein is not intended to be limiting in any way. Rather, it is the relative positioning between nearby airfoils, i.e., the clocking relationship, as delineated below and in the claims, that is significant, not the method by which the clocking relationship is described.

Through analytical modeling and experimental data, it has been discovered that certain clocking configurations provide certain operational advantages to the compressor 118 and the turbine 124. More specifically, it has been discovered that the mechanical or operational stresses experienced by airfoil rows during operation, which may include a shaking or rocking of the airfoils, especially stator blades, can be significantly affected by the clocking relationships of neighboring and/or nearby airfoil rows. Certain clocking relationships increase the operational stresses acting on a particular row of airfoils, while other clocking relationships decrease the stresses acting on the row. Further, though FIGS. 4-7 show only clocking configurations involving 3 rows of airfoils, it has been discovered that clocking relationships spanning additional rows may be used so that further operational advantages may be realized.

Figure 8:
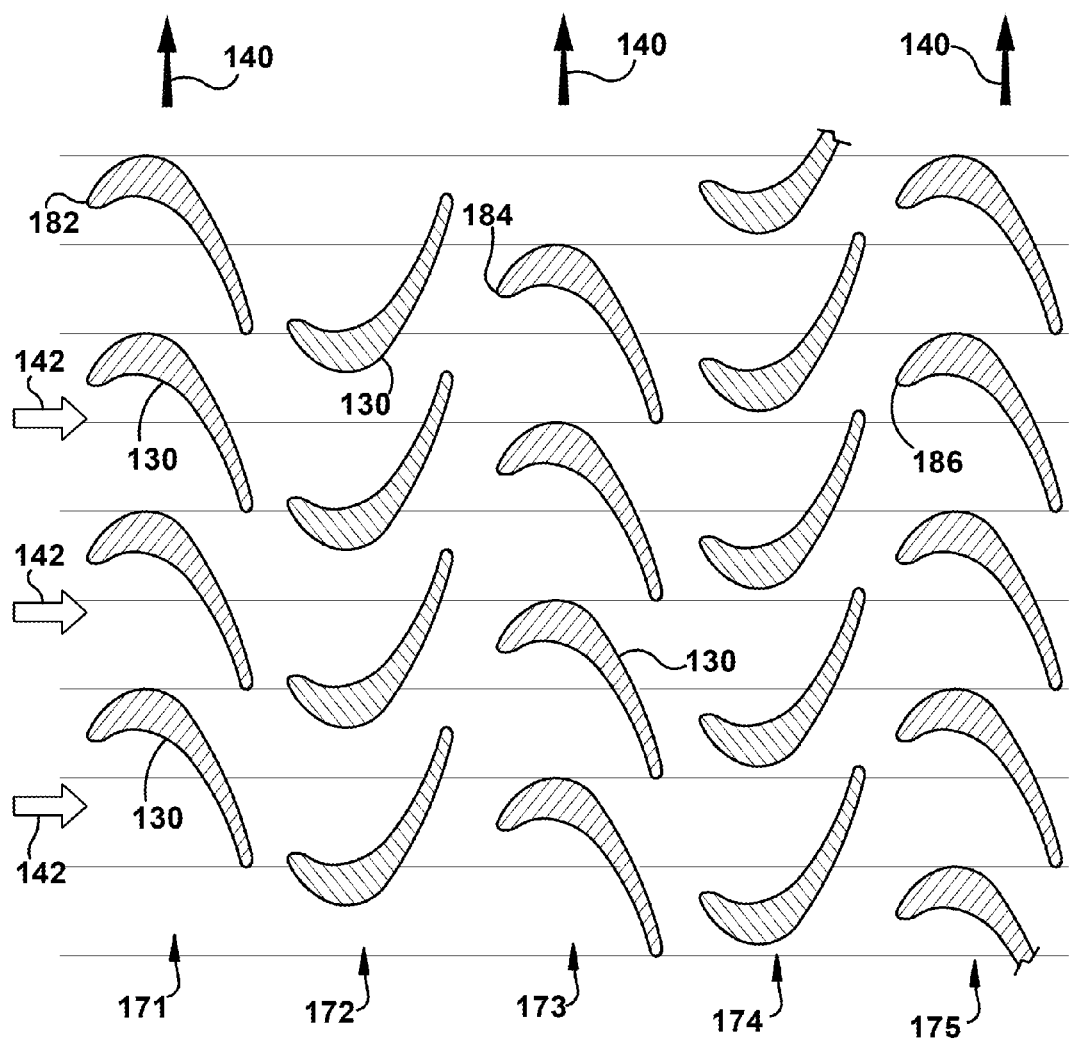
FIG. 8 is a schematic representation of neighboring rows of airfoils illustrating clocking relationships according to exemplary embodiments of the present application.

FIG. 8 illustrates clocking configurations according to exemplary embodiments of the present invention. FIG. 8 includes five rows of airfoils shown side-by-side: a first airfoil row 171; a second airfoil row 172; a third airfoil row 173; a fourth airfoil row 174; and a fifth airfoil row 175. As one of ordinary skill in the art will appreciate, the first airfoil row 171, the third airfoil row 173, and the fifth airfoil row 175 may represent rotor blades, and, between these rows of rotor blades, the second airfoil row 172 and the fourth airfoil row 174 may represent rows of stator blades. Alternatively, the first airfoil row 171, the third airfoil row 173, and the fifth airfoil row 175 also may represent stator blades. In this case, between the rows of stator blades, the second airfoil row 172 and the fourth airfoil row 174 may represent rotor blades. Further, as one of ordinary skill in the art will appreciate, the first airfoil row 171, the third airfoil row 173, and the fifth airfoil row 175, whether they are each stator blades or rotor blades, will have substantially no relative motion between them during operation (i.e., all rows either remain stationary if they are stator blades or rotate at the same velocity if they are rotor blades). Also, the second airfoil row 172 and the fourth airfoil row 174, whether they are each stator blades or rotor blades, will have substantially no relative motion between them during operation (i.e., these two rows either remain stationary if they are stator blades or rotate at the same velocity if they are rotor blades). Given this, of course, the first airfoil row 171, the third airfoil row 173, and the fifth airfoil row 175 will have substantially the same relative motion in relation to the second airfoil row 172 and the fourth airfoil row 174 (i.e., either the first airfoil row 171, the third airfoil row 173, and the fifth airfoil row 175 rotate while the second airfoil row 172 and the fourth airfoil row 174 remain stationary or the three rows remaining stationary while the second airfoil row 172 and the fourth airfoil row 174 rotate). As one of ordinary skill in the art will appreciate, the rows of airfoils in FIG. 8 may be located in the compressor 118 or the turbine 124 of a turbine engine.

Further, as already described, generally, for the clocking configurations to perform more effectively, the first airfoil row 171, the third airfoil row 173, and the fifth airfoil row 175 may be configured substantially the same. As such, the first airfoil row 171, the third airfoil row 173, and the fifth airfoil row 175 of FIG. 8 generally may have the same number of airfoils or substantially the same number of airfoils. The airfoils on each row also may be substantially the same size and substantially spaced the same around the circumference of each row.

In FIG. 8, according to an exemplary embodiment of the current application, the third airfoil row 173 may be clocked by approximately 50% pitch in relation to the first airfoil row 171. Thus, as illustrated, the circumferential position of an airfoil in the third airfoil row 173 lags (given the direction of relative motion of the rows) the corresponding airfoil in the first airfoil row 171 by an offset of approximately 50% of the pitch measurement. As such, a leading edge of an airfoil in the first airfoil row 171 (one of which is identified with reference number 182) leads the leading edge of a corresponding airfoil in the third airfoil row 173 (which is identified with reference number 184) by a circumferential distance of approximately 50% of the pitch measurement.

Among other advantages, analytical modeling and experimental data have confirmed that clocking configurations of the approximate value depicted between the first airfoil row 171 and the third airfoil row 173, i.e., 50% pitch, provide a reduction in the stresses that act on the airfoils of the second airfoil row 172 during operation, including mechanical stresses such as shaking and rocking. That is, it has been discovered that a significant reduction in operational stresses acting on the airfoils of a particular row may be achieved by clocking the two neighboring rows of airfoils, i.e., the row of airfoils on each side of the particular row, in a manner consistent with that shown in FIG. 8, and that clocking configurations that are very near to or at the 50% pitch value provide an approximate maximum level of stress relief in some embodiments and applications. Also, it has been determined that clocking values within plus or minus 10% of the 50% pitch value provide stress reduction near the maximum stress reduction level. (As used herein, 50% pitch +/−10% is a pitch range between 45% and 55% pitch.) As one of ordinary skill in the art will appreciate, a reduction in operational stresses, among other advantageous, may extend the part life of airfoils, thus, allowing a turbine to operate in a more cost efficient manner.

In some embodiments, where two airfoil rows are clocked, such as the first airfoil row 171 and the third airfoil row 173, the first airfoil row 171 may be a row of compressor rotor blades 120, the second airfoil row 172 may be a row of compressor stator blades 122, and the third airfoil row 173 may be a row of compressor rotor blades 120. More specifically, in an exemplary embodiment of the present application, the first airfoil row 171 may be the row of compressor rotor blades 120 in the fourteenth stage of a compressor, the second airfoil row 172 may be the row of compressor stator blades 122 in the fourteenth stage of the compressor, and the third airfoil row 176 may be the row of compressor rotor blades 120 in the fifteenth stage of the compressor. In some cases of this exemplary embodiment, the fourteenth stage and the fifteenth stage may be the fourteenth and fifteenth stages of a F-Class Compressor of a 7F or 9F Gas Turbine Engine manufactured by The General Electric Company of Schenectady, N.Y. Additionally, in this example and in some embodiments, the compressor may have 17 total stages of airfoils, each stage having a single row of rotor blades followed by a single row of stator blades. The row of rotor blades in the fourteenth stage may have a total of 64 rotor blades and the row of rotor blades in the fifteenth stage may have a total of 64 rotor blades. Finally, in some embodiments, the row of stator blades in the fourteenth stage may have a total of 132 stator blades, and the row of stator blades in the fifteenth stage may have a total of 130 stator blades. It has been found through experimental data and analytical modeling that clocking relationships, as those described and claimed herein, function well with the compressor configurations described above in this paragraph.

Additionally, in an alternative embodiment, the first airfoil row 171 may be the row of compressor rotor blades 120 in the fifteenth stage of a compressor, the second airfoil row 172 may be the row of compressor stator blades 122 in the fifteenth stage of the compressor, and the third airfoil row 176 may be the row of compressor rotor blades 120 in the sixteenth stage of the compressor. In some cases of this exemplary embodiment, the fifteenth stage and the sixteenth stage may be the fifteenth and sixteenth stages of a F-Class Compressor of a 7F or 9F Gas Turbine Engine manufactured by The General Electric Company of Schenectady, N.Y. Additionally, in this example and in some embodiments, the compressor may have 17 total stages of airfoils, each stage having a single row of rotor blades followed by a single row of stator blades. The row of rotor blades in the fifteenth stage may have a total of 64 rotor blades and the row of rotor blades in the sixteenth stage may have a total of 64 rotor blades. Finally, in some embodiments, the row of stator blades in the fifteenth stage may have a total of 130 stator blades, and the row of stator blades in the sixteenth stage may have a total of 132 stator blades. It has been found through experimental data and analytical modeling that clocking relationships, as those described and claimed herein, function well with the compressor configurations described above in this paragraph.

Analytical modeling and experimental data also have confirmed that operational advantages and stress reductions may be achieved through a broader range of clocking configurations than those described above, though the advantages, in some embodiments, may not be as great. Operational stresses may be reduced within clocking configurations between the first airfoil row 171 and the third airfoil row 173 of approximately 50% pitch +/−50%. (As used herein, 50% pitch +/−50% is a pitch range between 25% and 75% pitch.) Better results, as described above, may be achieved as the offset range nears the 50% pitch level. An offset within a range of approximately 50% pitch +/−30% (i.e., a pitch range between 35% and 65% pitch) may provide more appreciable operational advantages and stress reductions than values outside this more narrow range.

FIG. 8 also includes two additional rows of airfoils. The fourth airfoil row 174 and the fifth airfoil row 175. In the same manner as that described above for the second airfoil row 172, the operational stresses on the fourth airfoil row 174 may be reduced by clocking the fifth airfoil row 175 in relation to the third airfoil row 173. In some embodiments, where two airfoil rows are clocked to the advantage of a middle airfoil row, the middle airfoil row may be a row of stator blades and the two clocked airfoil rows may be rows of rotor blades. In other embodiments, the middle airfoil row may be a row of rotor blades and the two clocked airfoil rows may be rows of stator blades. The airfoil rows may be compressor airfoil rows or turbine airfoil rows.

Additionally, it has been discovered that the operational stresses acting on a particular row of airfoils may be further reduced by clocking more than the two neighboring airfoil rows, i.e., the airfoils directly to each side. The first airfoil row 171, the third airfoil row 173, and the fifth airfoil row 175 may be clocked in relation to each other such that the row situated in the relative position of the fourth airfoil row 174 may experience, in some embodiments, a more significant reduction in operational stresses. In this case, the third airfoil row 173 may be clocked at approximately 50% pitch in relation to the first airfoil row 171, and the fifth airfoil row 175 may be clocked at approximately 50% pitch in relation to the third airfoil row 173. Thus, as illustrated, the leading edge of an airfoil in the first airfoil row 171 (see reference number 182) leads the leading edge of a corresponding airfoil in the third airfoil row 173 (see reference number 184) by a circumferential distance of approximately 50% of the pitch measurement, and the leading edge of the airfoil in the third airfoil row 173 (see reference number 184) leads the leading edge of the corresponding airfoil in the fifth airfoil row 175 by a circumferential distance of approximately 50% of the pitch measurement. The range of pitch values that may be used for embodiments involving three clocked rows of airfoils is the same as the range of pitch values that may be used for embodiments involving two clocked rows of airfoils. That is, an approximate maximum stress relief to the airfoils located in the fourth airfoil row 174 may be achieved when the third airfoil row 173 is clocked at approximately 50% pitch in relation to the first airfoil row 171 and the fifth airfoil row 175 is clocked by approximately 50% pitch in relation to the third airfoil row 173.

It has also been determined that other clocking configurations for the first airfoil row 171, the third airfoil row 173, and the fifth airfoil row 175 that are within the ranges described above provide appreciable and significant operational benefits and reductions in operational stresses to the fourth airfoil row 174. As such, a pitch range of between 45% and 55% pitch, 35% and 65% pitch, or 25% and 75% pitch all may be used with a varying level of success. Further, the clocking relationship between the first airfoil row 171 and the third airfoil row 173 and the third airfoil row 173 and the fifth airfoil row 175 do not have to be the same for operational benefits and stress reductions to be realized (though, they may be approximately the same). That is, in cases where three rows are being clocked, operational benefits and stress reductions may be realized as long as the clocking relationship between the first airfoil row 171 and the third airfoil row 173 is within one of the ranges discussed above while the clocking relationship between the third airfoil row 173 and the fifth airfoil row 175 is within one of the ranges discussed above (though different than the clocking relationship between the first airfoil row 171 and the third airfoil row 173). In short, as long as both are within the broadest pitch range—i.e., between 25% and 75% pitch—operational benefits will be seen. In some embodiments, clocking the first airfoil row 171 and the third airfoil row 173 and the third airfoil row 173 and the fifth airfoil row 175 at or near the same pitch may increase the realized operational benefits and stress reductions.

In some embodiments, where three airfoil rows are clocked, the first airfoil row 171, the third airfoil row 173, and the fifth airfoil row 175 may be rows of rotor blades and the second airfoil row 172 and the fourth airfoil row 174 may be rows of stator blades. In other embodiments, the first airfoil row 171, the third airfoil row 173, and the fifth airfoil row 175 may be rows of stator blades and the second airfoil row 172 and the fourth airfoil row 174 may be a row of rotor blades. In either case, the airfoil rows may be located in the compressor or the turbine of a turbine engine. As a further advantage, the operational stresses acting on the rows of airfoils that are clocked in relation to each other, which, might include, for example, the first airfoil row 171 and the third airfoil row 173, or might include the first airfoil row 171, the third airfoil row 173, and the fifth airfoil row 175, also may be reduced.

Additionally, in some embodiments, where three airfoil rows are clocked, such as the first airfoil row 171, the third airfoil row 173, and the fifth airfoil row 175, the first airfoil row 171 may be a row of compressor rotor blades 120, the second airfoil row 172 may be a row of compressor stator blades 122, the third airfoil row 173 may be a row of compressor rotor blades 120, the fourth airfoil row 174 may be a row of compressor stator blades 122, and the fifth airfoil row 175 may be a row of compressor rotor blades 120. More specifically, in an exemplary embodiment of the present application, the first airfoil row 171 may be the row of compressor rotor blades 120 in the fourteenth stage of a compressor, the second airfoil row 172 may be the row of compressor stator blades 122 in the fourteenth stage of the compressor, the third airfoil row 176 may be the row of compressor rotor blades 120 in the fifteenth stage of the compressor, the fourth airfoil row 174 may be the row of compressor stator blades 122 in the fifteenth stage of the compressor, and the fifth airfoil row 175 may be the row of compressor rotor blades 120 in the sixteenth stage of the compressor. In some cases of this exemplary embodiment, the fourteenth stage, the fifteenth stage, and the sixteenth stage may be the fourteenth, fifteenth, and sixteenth stages of a F-Class Compressor of a 7F or 9F Gas Turbine Engine manufactured by The General Electric Company of Schenectady, N.Y. Additionally, in this example and in some embodiments, the compressor may have 17 total stages of airfoils, each stage having a single row of rotor blades followed by a single row of stator blades. The row of rotor blades in the fourteenth stage may have a total of 64 rotor blades, the row of rotor blades in the fifteenth stage may have a total of 64 rotor blades, and the row of rotor blades in the sixteenth stage may have a total of 64 rotor blades. Finally, in some embodiments, the row of stator blades in the fourteenth stage may have a total of 132 stator blades, the row of stator blades in the fifteenth stage may have a total of 130 stator blades, and the row of stator blades in the sixteenth stage may have a total of 132 stator blades. It has been found through experimental data and analytical modeling that clocking relationships, as those described and claimed herein, function well with the compressor configurations described above in this paragraph.

From the above description of preferred embodiments of the invention, those skilled in the art will perceive improvements, changes and modifications. Such improvements, changes and modifications within the skill of the art are intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

We claim:

1. An assembly of airfoils in a compressor of a turbine engine, the assembly comprising at least three axially stacked rows of airfoils: a middle airfoil row, a first upstream airfoil row, and a first downstream airfoil row;
wherein:
the middle airfoil row is bordered on each side by the first upstream airfoil row, which comprises the first row of airfoils in the upstream direction from the middle airfoil row, and the first downstream airfoil row, which comprises the first row of airfoils in the downstream direction from the middle airfoil row;
the first upstream airfoil row and the first downstream airfoil row have substantially the same number of similarly shaped airfoils;
the first upstream airfoil row and the first downstream airfoil row each comprise a row of rotor blades, which rotate at substantially the same speed during operation;
the middle airfoil row comprises a row of stator blades, which remains substantially stationary during operation;
at least 90% of the airfoils of the first upstream airfoil row and at least 90% of the airfoils of the first downstream airfoil row comprise a clocking relationship of between 25% and 75% pitch;
further comprising a second upstream airfoil row, which borders the first upstream airfoil row and comprises the second row of airfoils in the upstream direction from the middle airfoil row; and a third upstream airfoil row, which borders the second upstream airfoil row and comprises the third row of airfoils in the upstream direction from the middle airfoil row;
wherein the third upstream airfoil row, the first upstream airfoil row, and the first downstream airfoil row have substantially the same number of similarly shaped airfoils;
wherein the third upstream airfoil row, the first upstream airfoil row, and the first downstream airfoil row each comprise a row of rotor blades, which rotate at substantially the same speed during operation;
wherein the second upstream airfoil row comprises a row of stator blades, which remain substantially stationary during operation; and
wherein at least 90% of the airfoils of the third upstream airfoil row and at least 90% of the airfoils of the first upstream airfoil row comprise a clocking relationship of between 25% and 75% pitch.

2. The assembly of airfoils according to claim 1, wherein substantially all of the airfoils of the first upstream airfoil row and substantially all of the airfoils of the first downstream airfoil row comprise a clocking relationship of between 25% and 75% pitch.

3. The assembly of airfoils according to claim 1, wherein at least 90% of the airfoils of the first upstream airfoil row and at least 90% of the airfoils of the first downstream airfoil row comprise a clocking relationship of between 25.5% and 74.5% pitch.

4. The assembly of airfoils according to claim 1, wherein at least 90% of the airfoils of the first upstream airfoil row and at least 90% of the airfoils of the first downstream airfoil row comprise a clocking relationship of between 35% and 65% pitch.

5. The assembly of airfoils according to claim 1, wherein at least 90% of the airfoils of the first upstream airfoil row and at least 90% of the airfoils of the first downstream airfoil row comprise a clocking relationship of between 45% and 55% pitch.

6. The assembly of airfoils according to claim 1, wherein at least 90% of the airfoils of the first upstream airfoil row and at least 90% of the airfoils of the first downstream airfoil row comprise a clocking relationship of approximately 50% pitch.

7. The assembly of airfoils according to claim 1, wherein substantially all of the airfoils of the third upstream airfoil row and substantially all of the airfoils of the first upstream airfoil row comprise a clocking relationship of between 25% and 75% pitch.

8. The assembly of airfoils according to claim 1, wherein at least 90% of the airfoils of the third upstream airfoil row and at least 90% of the airfoils of the first upstream airfoil row comprise a clocking relationship of between 25.5% and 74.5% pitch.

9. The assembly of airfoils according to claim 1, wherein at least 90% of the airfoils of the third upstream airfoil row and at least 90% of the airfoils of the first upstream airfoil row comprise a clocking relationship of between 35% and 65% pitch.

10. The assembly of airfoils according to claim 1, wherein at least 90% of the airfoils of the third upstream airfoil row and at least 90% of the airfoils of the first upstream airfoil row comprise a clocking relationship of between 45% and 55% pitch.

11. The assembly of airfoils according to claim 1, wherein at least 90% of the airfoils of the third upstream airfoil row and at least 90% of the airfoils of the first upstream airfoil row comprise a clocking relationship of approximately 50% pitch.

12. The assembly of airfoils according to claim 1, wherein:
the third upstream airfoil row comprises a row of rotor blades in a fourteenth stage of the compressor;
the second upstream airfoil row comprises a row of stator blades in the fourteenth stage of the compressor;
the first upstream airfoil row comprises a row of rotor blades in a fifteenth stage of the compressor;
the middle airfoil row comprises a row of stator blades in the fifteenth stage of the compressor; and
the first downstream airfoil row comprises a row of rotor blades in a sixteenth stage of the compressor.

13. The assembly of airfoils according to claim 12, wherein the row of rotor blades in the fourteenth stage comprises 64 rotor blades, the row of rotor blades in the fifteenth stage comprises 64 rotor blades, and the row of rotor blades in the sixteenth stage comprises 64 rotor blades.

14. The assembly of airfoils according to claim 13, wherein the row of stator blades in the fourteenth stage comprises 132 stator blades, and the row of stator blades in the fifteenth stage comprises 130 stator blades.

15. An assembly of airfoils in a compressor of a turbine engine, the assembly comprising at least three axially stacked rows of airfoils: a middle airfoil row, a first upstream airfoil row, and a first downstream airfoil row;
wherein:
the middle airfoil row is bordered on each side by the first upstream airfoil row, which comprises the first row of airfoils in the upstream direction from the middle airfoil row, and the first downstream airfoil row, which comprises the first row of airfoils in the downstream direction from the middle airfoil row;
the first upstream airfoil row and the first downstream airfoil row have substantially the same number of similarly shaped airfoils;
the first upstream airfoil row and the first downstream airfoil row each comprise a row of rotor blades, which rotate at substantially the same speed during operation;
the middle airfoil row comprises a row of stator blades, which remains substantially stationary during operation; and
at least 90% of the airfoils of the first upstream airfoil row and at least 90% of the airfoils of the first downstream airfoil row comprise a clocking relationship of between 25% and 75% pitch;
the first upstream airfoil row comprises a row of rotor blades in a fourteenth stage of the compressor;
the middle airfoil row comprises a row of stator blades in the fourteenth stage of the compressor; and
the first downstream airfoil row comprises a row of rotor blades in a fifteenth stage of the compressor.

16. The assembly of airfoils according to claim 15, wherein the row of rotor blades in the fourteenth stage comprises 64 rotor blades and the row of rotor blades in the fifteenth stage comprises 64 rotor blades.

17. The assembly of airfoils according to claim 16, wherein the row of stator blades in the fourteenth stage comprises 132 stator blades.

18. An assembly of airfoils in a compressor of a turbine engine, the assembly comprising at least three axially stacked rows of airfoils: a middle airfoil row, a first upstream airfoil row, and a first downstream airfoil row;
wherein:
the middle airfoil row is bordered on each side by the first upstream airfoil row, which comprises the first row of airfoils in the upstream direction from the middle airfoil row, and the first downstream airfoil row, which comprises the first row of airfoils in the downstream direction from the middle airfoil row;
the first upstream airfoil row and the first downstream airfoil row have substantially the same number of similarly shaped airfoils;
the first upstream airfoil row and the first downstream airfoil row each comprise a row of rotor blades, which rotate at substantially the same speed during operation;
the middle airfoil row comprises a row of stator blades, which remains substantially stationary during operation;
at least 90% of the airfoils of the first upstream airfoil row and at least 90% of the airfoils of the first downstream airfoil row comprise a clocking relationship of between 25% and 75% pitch;
the first upstream airfoil row comprises a row of rotor blades in a fifteenth stage of the compressor;
the middle airfoil row comprises a row of stator blades in the fifteenth stage of the compressor; and
the first downstream airfoil row comprises a row of rotor blades in a sixteenth stage of the compressor.

19. The assembly of airfoils according to claim 18, wherein the row of rotor blades in the fifteenth stage comprises 64 rotor blades, and the row of rotor blades in the sixteenth stage comprises 64 rotor blades.

20. The assembly of airfoils according to claim 19, wherein the row of stator blades in the fifteenth stage comprises 130 stator blades.

21. In a compressor of a turbine engine, the compressor comprising at least three axially stacked rows of airfoils: a middle airfoil row, a first upstream airfoil row, and a first downstream airfoil row; wherein the middle airfoil row is bordered on each side by the first upstream airfoil row, which comprises the first row of airfoils in the upstream direction from the middle airfoil row, and the first downstream airfoil row, which comprises the first row of airfoils in the downstream direction from the middle airfoil row; wherein the first upstream airfoil row and the first downstream airfoil row have substantially the same number of similarly shaped airfoils; wherein the first upstream airfoil row and the first downstream airfoil row each comprise a row of rotor blades, which rotate at substantially the same speed during operation; and wherein the middle airfoil row comprises a row of stator blades, which remains substantially stationary during operation; a method of operating a turbine engine, the method comprising:
configuring the airfoils of the first upstream airfoil row and the airfoils of first downstream airfoil row such that at least 90% the airfoils of the first upstream airfoil row and at least 90% the airfoils of the first downstream airfoil row comprise a clocking relationship of between 25% and 75% pitch;

wherein a second upstream airfoil row borders the first upstream airfoil row and comprises a second row of airfoils in the upstream direction from the middle airfoil row;

wherein a third upstream airfoil row borders the second upstream airfoil row and comprises a third row of airfoils in the upstream direction from the middle airfoil row;

wherein the third upstream airfoil row, the first upstream airfoil row, and the first downstream airfoil row have substantially the same number of similarly shaped airfoils;

wherein the third upstream airfoil row, the first upstream airfoil row, and the first downstream airfoil row each comprise a row of rotor blades, which rotate at substantially the same speed during operation; and wherein the second upstream airfoil row comprises a row of stator blades, which remain substantially stationary during operation;

further comprising the step of configuring the airfoils of the third upstream airfoil row and the airfoils of first upstream airfoil row such that at least 90% the airfoils of the third upstream airfoil row and at least 90% the airfoils of the first upstream airfoil row comprise a clocking relationship of between 25% and 75% pitch.

22. The method according to claim 21, further comprising the step of configuring the airfoils of the first upstream airfoil row and the airfoils of first downstream airfoil row such that substantially all of the airfoils of the first upstream airfoil row and substantially all of the airfoils of the first downstream airfoil row comprise a clocking relationship of between 25% and 75% pitch.

23. The method according to claim 21, further comprising the step of configuring the airfoils of the first upstream airfoil row and the airfoils of first downstream airfoil row such that at least 90% the airfoils of the first upstream airfoil row and at least 90% the airfoils of the first downstream airfoil row comprise a clocking relationship of between 35% and 65% pitch.

24. The method according to claim 21, further comprising the step of configuring the airfoils of the first upstream airfoil row and the airfoils of first downstream airfoil row such that at least 90% the airfoils of the first upstream airfoil row and at least 90% the airfoils of the first downstream airfoil row comprise a clocking relationship of between 45% and 55% pitch.

25. The method according to claim 21, further comprising the step of configuring the airfoils of the first upstream airfoil row and the airfoils of first downstream airfoil row such that at least 90% the airfoils of the first upstream airfoil row and at least 90% the airfoils of the first downstream airfoil row comprise a clocking relationship of approximately 50% pitch.

26. The method according to claim 21, further comprising the step of configuring the airfoils of the third upstream airfoil row and the airfoils of first upstream airfoil row such that substantially all of the airfoils of the third upstream airfoil row and substantially all of the airfoils of the first upstream airfoil row comprise a clocking relationship of between 25% and 75% pitch.

27. The method according to claim 21, further comprising the step of configuring the airfoils of the third upstream airfoil row and the airfoils of first upstream airfoil row such that at least 90% the airfoils of the third upstream airfoil row and at least 90% the airfoils of the first upstream airfoil row comprise a clocking relationship of between 35% and 65% pitch.

28. The method according to claim 21, further comprising the step of configuring the airfoils of the third upstream airfoil row and the airfoils of first upstream airfoil row such that at least 90% the airfoils of the third upstream airfoil row and at least 90% the airfoils of the first upstream airfoil row comprise a clocking relationship of approximately 50% pitch.

29. The method according to claim 21, wherein:
the first upstream airfoil row comprises a row of rotor blades in a fourteenth stage of the compressor;
the middle airfoil row comprises a row of stator blades in the fourteenth stage of the compressor; and
the first downstream airfoil row comprises a row of rotor blades in a fifteenth stage of the compressor.

30. The method according to claim 29, wherein the row of rotor blades in the fourteenth stage comprises 64 rotor blades and the row of rotor blades in the fifteenth stage comprises 64 rotor blades.

31. The method according to claim 30, wherein the row of stator blades in the fourteenth stage comprises 132 stator blades.

32. The method according to claim 21, wherein:
the first upstream airfoil row comprises a row of rotor blades in a fifteenth stage of the compressor;
the middle airfoil row comprises a row of stator blades in the fifteenth stage of the compressor; and
the first downstream airfoil row comprises a row of rotor blades in a sixteenth stage of the compressor.

33. The method according to claim 32, wherein the row of rotor blades in the fifteenth stage comprises 64 rotor blades, and the row of rotor blades in the sixteenth stage comprises 64 rotor blades.

34. The method according to claim 33, wherein the row of stator blades in the fifteenth stage comprises 130 stator blades.

35. The method according to claim 21, wherein:
the third upstream airfoil row comprises a row of rotor blades in a fourteenth stage of the compressor;
the second upstream airfoil row comprises a row of stator blades in the fourteenth stage of the compressor;
the first upstream airfoil row comprises a row of rotor blades in a fifteenth stage of the compressor;
the middle airfoil row comprises a row of stator blades in the fifteenth stage of the compressor; and
the first downstream airfoil row comprises a row of rotor blades in a sixteenth stage of the compressor.

36. The method according to claim 35, wherein the row of rotor blades in the fourteenth stage comprises 64 rotor blades, the row of rotor blades in the fifteenth stage comprises 64 rotor blades, and the row of rotor blades in the sixteenth stage comprises 64 rotor blades.

37. The method according to claim 36, wherein the row of stator blades in the fourteenth stage comprises 132 stator blades, and the row of stator blades in the fifteenth stage comprises 130 stator blades.

\* \* \* \* \*

UNITED STATES PATENT AND TRADEMARK OFFICE
CERTIFICATE OF CORRECTION

Page 1 of 1

PATENT NO. : 8,439,626 B2
APPLICATION NO. : 12/344826
DATED : May 14, 2013
INVENTOR(S) : Ning et al.

It is certified that error appears in the above-identified patent and that said Letters Patent is hereby corrected as shown below:

In the Specification

In Column 2, Line 50, delete "b)" and insert -- (b) --, therefor.

In Column 5, Lines 41-42, delete "136" (i.e., the first airfoil row 136" and insert -- 134" (i.e., the first airfoil row 134 --, therefor.

In Column 8, Lines 55-56, delete "third airfoil row 176" and insert -- third airfoil row 173 --, therefor.

In Column 9, Line 13, delete "third airfoil row 176" and insert -- third airfoil row 173 --, therefor.

In Column 11, Line 15, delete "third airfoil row 176" and insert -- third airfoil row 173 --, therefor.

In the Claims

In Column 13, Line 33, in Claim 13, delete "64 rotor blades," and insert -- 64 rotor blades, --, therefor.

In Column 15, Line 1, in Claim 21, delete "90% the airfoils" and insert -- 90% of the airfoils --, therefor at each occurrence throughout the claims.

In Column 16, Line 37, in Claim 33, delete "64 rotor blades," and insert -- 64 rotor blades, --, therefor.

Signed and Sealed this
First Day of October, 2013

Teresa Stanek Rea
*Deputy Director of the United States Patent and Trademark Office*